United States Patent
Lanau et al.

(10) Patent No.: US 11,572,495 B2
(45) Date of Patent: Feb. 7, 2023

(54) ADHESION PROMOTERS FOR POLYADDITION SILICONE FORMULATIONS

(71) Applicant: Henkel AG & Co. KGaA, Duesseldorf (DE)

(72) Inventors: Sebastien Lanau, Milan (IT); Antonio Grauso, Castano Primo (IT); Alessio Faggianelli, Paderno Dugnano (IT); Giorgio Zaffaroni, Suno (IT)

(73) Assignee: Henkel AG & Co. KGaA, Duesseldorf (DE)

(*) Notice: Subject to any disclaimer, the term of this patent is extended or adjusted under 35 U.S.C. 154(b) by 645 days.

(21) Appl. No.: 16/662,301

(22) Filed: Oct. 24, 2019

(65) Prior Publication Data

US 2020/0056077 A1 Feb. 20, 2020

Related U.S. Application Data

(63) Continuation of application No. PCT/EP2018/054019, filed on Feb. 19, 2018.

(30) Foreign Application Priority Data

Apr. 24, 2017 (EP) .................................... 17167691

(51) Int. Cl.
| | | |
|---|---|---|
| *C08G 77/12* | (2006.01) | |
| *C09J 183/06* | (2006.01) | |
| *C08G 77/08* | (2006.01) | |
| *C08G 77/18* | (2006.01) | |
| *C08G 77/20* | (2006.01) | |
| *C08K 5/00* | (2006.01) | |

(52) U.S. Cl.
CPC ............ *C09J 183/06* (2013.01); *C08G 77/08* (2013.01); *C08G 77/12* (2013.01); *C08G 77/18* (2013.01); *C08G 77/20* (2013.01); *C08K 5/0025* (2013.01); *C08G 2170/00* (2013.01)

(58) Field of Classification Search
CPC ........ C08G 77/12; C08G 77/20; C08G 77/18; C08L 83/04; C08L 43/04; C09J 183/04
See application file for complete search history.

(56) References Cited

U.S. PATENT DOCUMENTS

| | | |
|---|---|---|
| 3,419,593 A | 12/1968 | Willing |
| 3,699,072 A | 10/1972 | Clark et al. |
| 4,340,709 A | 7/1982 | Jeram et al. |
| 6,562,180 B1 | 5/2003 | Bohin et al. |
| 6,613,185 B1 | 9/2003 | Valade et al. |
| 7,781,560 B2 | 8/2010 | Ushio et al. |
| 7,842,755 B2 | 11/2010 | Morita et al. |
| 2011/0224344 A1 | 9/2011 | Fujisawa et al. |
| 2017/0190879 A1 | 7/2017 | Iimura et al. |

FOREIGN PATENT DOCUMENTS

| | | |
|---|---|---|
| CN | 1993427 A | 7/2007 |
| CN | 101198655 A | 6/2008 |
| CN | 102159647 A | 8/2011 |
| CN | 104744704 A | 7/2015 |
| CN | 106488949 A | 3/2017 |
| GB | 1338537 A | 11/1973 |
| JP | 2005060549 * | 3/2005 |
| JP | 2011208120 | 10/2011 |
| JP | 2015003986 A | 1/2015 |

OTHER PUBLICATIONS

JP 2005 060549 machine translation (2005).*
International Search Report issued in connection with International Patent Application No. PCT/EP2018/054019 dated Apr. 10, 2018.
"Silicones", Apr. 2, 15883 (2883-84-15), Encyclopedia of Polymer Science and Techno, Wiley, US, pp. 765-841, XP887918236.

* cited by examiner

*Primary Examiner* — Kuo Liang Peng
(74) *Attorney, Agent, or Firm* — James E. Piotrowski

(57) ABSTRACT

The present invention relates to two-component (2K) silicone-based adhesive compositions comprising an adhesion promotor, as well as to the use of such compositions. Furthermore, the present invention is directed to the use of a —Si(OR$^a$)$_3$ terminated polyorganosiloxane prepolymer, as described herein, for improving the adhesive properties of silicone-based adhesive compositions.

13 Claims, No Drawings

ADHESION PROMOTERS FOR POLYADDITION SILICONE FORMULATIONS

The present invention relates to two-component (2K) silicone-based adhesive compositions comprising an adhesion promoter, as well as to the use of such compositions. Furthermore, the present invention is directed to the use of a —Si(OR$^a$)$_3$ terminated polyorganosiloxane prepolymer, as described herein, for improving the adhesive properties of silicone-based adhesive compositions.

The silicone-based polyaddition curing system is well known to have several advantages, such as good mechanical properties, good thermal and chemical resistance, low shrinkage, no byproducts, and is used in several fields of application (food, dental, molding). However, to date, such systems suffer from overall poor adhesion.

The object of the present invention was therefore the provision of a silicone-based polyaddition curing system having improved adhesion properties on various surfaces, including metal and plastic surfaces.

In a first aspect, the present invention thus relates to a two-component silicone-based adhesive composition comprising a first component (A) comprising at least one vinyl-terminated polysiloxane polymer and at least one hydrosilyl group-containing crosslinker, and a second component (B) comprising at least one —Si(OR$^a$)$_3$ terminated polyorganosiloxane prepolymer, a hydrosilylation catalyst and at least one vinyl-terminated polysiloxane polymer, wherein OR$^a$ is a hydrolysable group and the —Si(OR$^a$)$_3$ terminated polyorganosiloxane prepolymer is obtainable by reacting a hydrogen-terminated polyorganosiloxane with a vinyl group and —Si(OR$^a$)$_3$ group containing silane in the presence of a catalyst, wherein the hydrogen-terminated polyorganosiloxane is used in molar excess with respect to the ratio of reactive hydrogen atoms to vinyl groups of the vinyl group and —Si(OR$^a$)$_3$ group containing silane.

In another aspect, the present invention relates to the use of the silicone-based adhesive composition as described herein for bonding two or more substrates.

In yet another aspect, the present invention relates to the use of a —Si(OR$^a$)$_3$ terminated polyorganosiloxane prepolymer, obtainable by reacting a hydrogen-terminated polyorganosiloxane with a vinyl group and —Si(OR$^a$)$_3$ group containing silane, in the presence of a catalyst, wherein the hydrogen-terminated polyorganosiloxane is used in molar excess with respect to the ratio of reactive hydrogen atoms to vinyl groups, as an adhesion promoter in silicone-based polyaddition curing adhesive compositions.

Further embodiments are defined in the appended claims.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules.

In the present specification, the terms "a" and "an" and "at least one" are the same as the term "one or more" and can be employed interchangeably.

The term "about", as used in the context of the present invention, defines a range of +/−10%, preferably +/−5% of the specific value given.

All percentages given herein in relation to the compositions or formulations relate to weight % relative to the total weight of the respective composition or formula, if not explicitly stated otherwise.

The inventors of the present invention surprisingly found that the use of reactive —Si(OR$^a$)$_3$ terminated polyorganosiloxane prepolymer, as disclosed herein, in silicone-based adhesive compositions results in improved adhesive properties of the respective cured adhesive product on different kinds of surfaces, in particular metal-based surfaces.

An object of the present invention is therefore providing a two-component silicone-based adhesive composition comprising an adhesion promoter. According to the present invention, said adhesion promoter is a —Si(OR$^a$)$_3$ terminated polyorganosiloxane prepolymer, obtainable by reacting a hydrogen-terminated polyorganosiloxane with a vinyl group and —Si(OR$^a$)$_3$ group containing silane in the presence of a catalyst.

According to the present invention, the hydrogen-terminated polyorganosiloxane is used in molar excess with respect to the ratio of reactive hydrogen atoms to vinyl groups. In other words, the reactive hydrogen groups of the hydrogen-terminated polyorganosiloxane are in molar excess relative to the vinyl groups present in the vinyl and —Si(OR$^a$)$_3$ group containing silane. In this way, a mixture comprising a —Si(OR$^a$)$_3$ terminated polyorganosiloxane prepolymer which has a reactive hydrogen group, i.e. hydrosilyl group, is obtained. For example, by reacting a SiH-terminated PDMS with an allyl-Si(OR$^a$)$_3$, a mixture of a polyorganosiloxane terminated with a hydrosilyl group and a —Si(OR$^a$)$_3$ group (""HSi-PDMS-ethylene-Si(OR$^a$)$_3$"), a polyorganosiloxane terminated with two hydrosilyl groups ("HSi-PDMS-SiH"), and a polyorganosiloxane terminated with two Si(OR$^a$)$_3$ groups ("(OR$^a$)$_3$Si-ethylene-PDMS-ethylene-Si(OR$^a$)$_3$") is obtained.

According to the present invention, the adhesive composition is a two-component (2K) silicone adhesive composition comprising a first component (A) comprising at least one vinyl-terminated polysiloxane polymer and at least one hydrosilyl group-containing crosslinker; and a second component (B) comprising at least one —Si(OR$^a$)$_3$ terminated polyorganosiloxane prepolymer, a hydrosilylation catalyst and at least one vinyl-terminated polysiloxane polymer.

The term "reactive hydrogen atom" or "reactive hydrogen group", as used in the context of the present invention, relates to hydrogen atoms directly bonded to a silicon atom.

The term "vinyl group containing", as used herein, refers to a compound comprising at least one vinyl moiety. Examples of vinyl group containing groups, as defined herein, that comprise one vinyl moiety include, for instance and without limitation, vinyl (ethenyl), allyl (2-propenyl), and 3-butenyl. Examples of vinyl group containing groups, as defined herein, that comprise two vinyl moiety include, for instance and without limitation, hex-3,5-dienyl and octa-4,6-dienyl. The vinyl and —Si(OR$^a$)$_3$ group containing silane is a molecule that comprises a vinyl group, as defined above, and the —Si(OR$^a$)$_3$ group. The term "silane", as used in relation to such a molecule, thus covers compounds that comprise the —Si(OR$^a$)$_3$ group as the only silicon containing group.

According to certain embodiments, the —Si(OR$^a$)$_3$ terminated polyorganosiloxane prepolymer is a —Si(OR$^a$)$_3$ terminated poly(diorganosiloxane) prepolymer, preferably a —Si(OR$^a$)$_3$ terminated poly(dialkyl siloxane) prepolymer. Thus, according to preferred embodiments, a —Si(OR$^a$)$_3$ terminated poly(diorganosiloxane) prepolymer is obtainable by reacting a hydrogen-terminated poly(diorganosiloxane)

with a vinyl group and —Si(OR$^a$)$_3$ group containing silane in the presence of a catalyst, and, according to more preferred embodiments, a —Si(OR$^a$)$_3$ terminated poly(dialkyl siloxane) prepolymer is obtainable by reacting a hydrogen-terminated poly(dialkyl siloxane) with a vinyl and —Si(OR$^a$)$_3$ group containing silane in the presence of a catalyst.

"Alkyl", as used in the context of the present invention, relates to a linear or branched hydrocarbon group having 1 to 20 carbon atoms. As non-limiting examples thereof, methyl, ethyl, propyl, isopropyl, tert-butyl, n-pentyl, and isopentyl may be mentioned.

While it is preferred that the silyl-terminated poly(diorganosiloxane) prepolymer is a —Si(OR$^a$)$_3$ terminated poly(dialkyl siloxane) prepolymer, in alternative embodiments the organic moieties in the poly(diorganosiloxane) may be aryl moieties, preferably phenyl, or alkyl and aryl moieties, such as the alkyl groups defined above and phenyl. Generally, the organic moiety ("organo") may thus be selected from alkyl and aryl moieties, as defined herein, while alkyl is typically preferred.

"Aryl", as used herein, relates to aromatic groups having 6 to 20 carbon atoms. As non-limiting examples thereof, phenyl, naphthyl, anthranyl, phenanthryl and the like may be mentioned, with phenyl being most preferred.

"OR$^a$", as used herein, represents a hydrolysable group. In various embodiments, each R$^a$ is independently alkyl or acyl (—C(=O)-alkyl), with "alkyl" as defined above. In preferred embodiments, the OR$^a$ groups are alkoxy groups. "Alkoxy", as used in the context of the present invention, relates to a linear or branched —O-alkyl group having 1 to 20 carbon atoms, wherein the alkyl group is as defined above. As non-limiting examples of alkoxy groups, methoxy, ethoxy, propoxy, isopropoxy, and tert-butoxy may be mentioned. Preferred are short-chain alkoxy groups, such as C$_{1-4}$ alkoxy, preferably methoxy, ethoxy and propoxy, more preferably methoxy and ethoxy, most preferably methoxy. In preferred embodiments OR$^a$ is an alkoxy group and the —Si(OR$^a$)$_3$ group containing compounds are trialkoxy silyl group-containing compounds. In alternative embodiments, one or more of the OR$^a$ groups are acyloxy groups. "Acyloxy", as used in the context of the present invention, relates to a linear or branched —O—C(O)—alkyl group having 2 to 20 carbon atoms, wherein the alkyl group is as defined above. Preferred acyloxy groups are acetoxy groups.

According to certain embodiments, the alkyl groups of the hydrogen-terminated poly(dialkyl siloxane) are each independently selected from the group consisting of methyl and ethyl, preferably methyl.

According to preferred embodiments, the hydrogen-terminated poly(dialkyl siloxane) is hydrogen-terminated poly(dimethyl siloxane). "Hydrogen-terminated", as used herein, refers to terminal hydrosilyl groups of the formula Si—H.

According to certain embodiments, the OR$^a$ groups of the vinyl group containing silane are independently selected from the group consisting of methoxy, ethoxy, propoxy, isopropoxy, tert-butoxy, n-pentoxy, isopentoxy, neopentoxy, and tert-pentoxy. Preferred are short-chain alkoxy groups, such as C$_{1-4}$ alkoxy, preferably methoxy, ethoxy and propoxy, more preferably methoxy and ethoxy, most preferably methoxy. The vinyl group containing silane is thus preferably a trialkoxy silane, more preferably a triethoxy or trimethoxy silane, with the latter being particularly preferred.

According to preferred embodiments, the vinyl group containing silane is a trialkoxy or triacetoxy, preferably trialkoxy silane with a C$_{2-6}$ hydrocarbon moiety comprising a vinyl group. In more preferred embodiments, the vinyl group containing silane is an allyl or vinyl trimethoxy silane. "Allyl", as used in this context, refers to the group H$_2$C=CH—CH$_2$—, and "vinyl" refers to the group H$_2$C=CH—.

The reaction between the hydrogen-terminated polyorganosiloxane, preferably the hydrogen-terminated poly(diorganosiloxane), more preferably the hydrogen-terminated poly(dialkyl siloxane), and the vinyl and —Si(OR$^a$)$_3$ group containing silane, preferably a trialkoxy silane with a C$_{2-6}$ hydrocarbon moiety comprising a vinyl group, more preferably vinyl or allyl trimethoxy silane, is performed in the presence of a catalyst. According to the present invention, said catalyst is a hydrosilylation catalyst that promotes the addition reaction of the two compounds as defined above. Typically, a catalyst may be employed in an amount of 0.01 to 3% by weight, preferably 0.05 to 2.5% by weight, based on the total weight of the —Si(OR$^a$)$_3$ terminated polyorganosiloxane prepolymer.

The catalyst can be any of the well-known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions. Thus, according to certain embodiments, the at least one hydrosilylation catalyst used in the synthesis of the prepolymer, that is, the at least one —Si(OR$^a$)$_3$ terminated polyorganosiloxane prepolymer, preferably the at least one —Si(OR$^a$)$_3$ terminated poly(diorganosiloxane) prepolymer, more preferably the at least one —Si(OR$^a$)$_3$ terminated poly(dialkyl siloxane) prepolymer according to the present invention is a platinum hydrosilylation catalyst.

Suitable hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl-1,1,3,3-tetramethyldisiloxane, i.e. 1,3-divinyl-1,1,3,3-tetramethyldisiloxane-platinum(0). Preferred catalysts include platinum(0) complexes with divinyl tetramethyl disiloxane or with methyl vinyl cyclosiloxane, obtainable as Catalysts 512 and 520, respectively, from Evonik Industries.

According to certain embodiments, in order to obtain a prepolymer particularly useful in the context of the present invention, it is crucial that the reactive hydrogen groups of the hydrogen-terminated polyorganosiloxane, preferably the hydrogen-terminated poly(diorganosiloxane), more preferably the hydrogen-terminated poly(dialkyl siloxane) are in molar excess, preferably more than 1.5 fold molar excess, more preferably about 2 fold molar excess relative to the vinyl groups of the vinyl group containing trialkoxy silane. Thus, according to certain embodiments, the hydrogen-terminated polyorganosiloxane, preferably the hydrogen-terminated poly(diorganosiloxane), more preferably the hydrogen-terminated poly(dialkyl siloxane) is used in molar excess, preferably more than 1.5 fold molar excess, more preferably about 2 fold molar excess with respect to the ratio of reactive hydrogen atoms to vinyl groups.

The silicone-based adhesive composition according to the present invention contains the prepolymer, that is, the at least one —Si(OR$^a$)$_3$ terminated polyorganosiloxane prepolymer, preferably the at least one —Si(OR$^a$)$_3$ terminated poly(diorganosiloxane) prepolymer, more preferably the at least one —Si(OR$^a$)$_3$ terminated poly(dialkyl siloxane) prepolymer in an amount in the range of 0.5 to 20% by weight, preferably 1 to 10% by weight, based on the total weight of the two-component silicone-based adhesive composition.

According to other embodiments, the prepolymer, that is, the at least one —Si(OR$^a$)$_3$ terminated polyorganosiloxane prepolymer, preferably the at least one —Si(OR$^a$)$_3$ terminated poly(diorganosiloxane) prepolymer, more preferably the at least one —Si(OR$^a$)$_3$ terminated poly(dialkyl siloxane) prepolymer is present in the second component (B) (also called "Part B") of the adhesive composition according to the present invention in an amount of 1.5 to 30% by weight, preferably 2 to 20% by weight, based on the weight of the component (B) of the silicone-based adhesive composition.

Vinyl-terminated polysiloxane polymers useful in the context of the present invention are known in the art and may, for instance, be selected from compounds represented by the following formula (I):

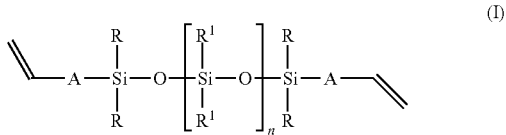

In formula (I), R and R$^1$ are independently selected from the group consisting of linear or branched alkyl groups having 1 to 20 carbon atoms, preferably 1 to 8 carbon atoms, A is independently selected from the group consisting of linear or branched alkylene having 1 to 10 carbon atoms or is absent, and n is 0 or an integer from 1 to 1500, for example 1 to 500. In particular, n is selected such that the viscosity of the compound according to formula (I) ranges from 1 to 165,000 mPa·s at 25° C. According to preferred embodiments, R and R$^1$ are independently selected from the group consisting of methyl, ethyl, n-propyl and isopropyl. According to certain embodiments, A is absent or selected from methylene. Especially preferred examples of vinyl-terminated polysiloxane polymers are vinyl-terminated polydimethyl siloxane (PDMS) polymers. The vinyl content of the vinyl-terminated polysiloxane polymers may vary, resulting in polymers of different reactivity and viscosity. Especially preferred examples of vinyl-terminated polydimethyl siloxane polymers include, without limitation, the Polymer VS series from Evonik Industries.

Further vinyl-terminated polymers useful in the context of the present invention include those of formula (I) above, wherein at least one R or R$^1$ is —O—Si(R)$_2$—[Si(R$^1$)$_2$—O]$_n$-A-CH=CH$_2$ with n and A as defined above and R and R$^1$ being independently selected from the group consisting of linear or branched alkyl groups having 1 to 20 carbon atoms, preferably 1 to 8 carbon atoms, or —O—Si(R)$_2$-[Si(R$^1$)$_2$—O]$_n$-A-CH=CH$_2$. Generally, vinyl-functionalized siloxanes comprising M, D, T and/or Q units can be used. Vinyl-functionalized MQ resins are, for example, commercially available from Evonik Industries.

The vinyl-terminated polysiloxane polymers, as described above, may be used as such or may be a mixture of two or more of the aforementioned polymers. Particularly preferred are mixtures of linear vinyl-terminated PDMS polymers and vinyl-functional MQ resins (tridimensional PDMS, vinyl functionalized), which are commercially available as VQM Polymer from Evonik Industries.

According to the present invention, the amount of the vinyl-terminated polysiloxane polymers in the silicone-based adhesive composition as described herein may be in the range of 1 to 90% by weight, preferably 10 to 80% by weight, more preferably 20 to 80% by weight, in particular 30 to 80% by weight, based on the total weight of the two-component silicone-based adhesive composition.

According to the present invention, the amount of the vinyl-terminated polysiloxane polymers in the second composition (B) (also called "Part B") of the silicone-based adhesive composition as described herein may be in the range of 10 to 90% by weight, preferably 10 to 80% by weight, more preferably 20 to 80% by weight, in particular 30 to 80% by weight, based on the weight of the component (B) of the silicone-based adhesive composition. The amount of the vinyl-terminated polysiloxane polymers in the first composition (A) (also called "Part A") of the silicone-based adhesive composition as described herein may be in a similar range as in the component (B), i.e. in the range of 10 to 90% by weight, preferably 10 to 80% by weight, more preferably 20 to 80% by weight, in particular 30 to 80% by weight, based on the weight of the component (A) of the silicone-based adhesive composition.

In the two-component silicon-based adhesive compositions according to the present invention, the prepolymer, as described herein, can be mixed with at least one vinyl-terminated polysiloxane polymer, as described above, wherein the vinyl-terminated polysiloxane polymers are, with respect to the vinyl groups, used in molar excess relative to the hydrosilyl groups of the prepolymer. Upon mixing, the prepolymer and the vinyl-terminated polysiloxane polymers undergo further addition polymerization, wherein the hydrosilyl groups of the prepolymer react with the vinyl groups of the vinyl-terminated polysiloxane polymers. The resultant polymers exhibit both vinyl groups, which are accessible to further addition polymerization reactions with hydrosilylation crosslinking agents, and trialkoxy silane end capping groups, which promote and improve adhesion of the eventually cured system to various surfaces. The mixing can occur already within component (B) so that the prepolymer reacts before it comes into contact with component (A). In any case, the formulation of the component (B) (i.e., part B) is done such that the vinyl groups are always in molar excess compared to the hydrogen groups of the prepolymer.

Hydrosilylation catalysts useful in the context of the present invention are known in the art and may, for instance, be selected from the hydrosilylation catalysts discussed above with respect to the preparation of the prepolymer according to the present invention.

The hydrosilylation catalyst may be present in the silicone-based adhesive composition in an amount of 0.01 to 5% by weight, preferably 0.02 to 4.5% by weight, based on the total weight of component (B) of the two-component silicon-based adhesive composition.

Crosslinking agents (also called "crosslinker") suitable in the context of the present invention are known in the art and may include, for instance, compounds that comprise at least two, preferably more than two hydrosilyl-groups. Preferred are modified PDMS polymers with SiH groups at the termini and, optionally, also within the chain.

Generally, from 0.1 to 8% by weight, preferably 0.2 to 7.5% by weight of the crosslinking agent may be employed, based on the total weight of component (A) of the two-component silicone-based adhesive composition.

The silicone-based adhesive composition according to the present invention may optionally comprise one or more further additives known in the art for the employment in silicone-based adhesive compositions. For instance, one or more additives suitable for employment in the context of the present invention may be selected from the group consisting of fillers and pigments.

Pigments that may be useful in the context of the present invention include carbon blacks, such as LB-1011C carbon black from Williams, chromium oxide pigments, such as Harcros G-6099, and titanium dioxides such as those available from DuPont.

Fillers suitable in this context are known in the art and may, for instance, be selected from one or more of crushed quartz, aluminum oxide, aluminum hydroxide, aluminum silicate, zirconium silicate, magnesium oxide, magnesium hydroxide, zinc oxide, talc, diatomaceous earth, iron oxide, calcium carbonate, clays, titania, zirconia, silica, fumed silica, mica, glass, sand, carbon black, graphite, barium sulfate, zinc sulfate, wood flour, cork, and fluoro-carbon polymer powder among others. The filler may be treated with conventional organosilicon treating agents which are well known in the art.

Of course, it is anticipated that the silicone-based adhesive composition according to the present invention may comprise further additives known and useful in this context, such as other silane- or siloxane-based compounds, including monomeric and polymeric compounds thereof.

If the at least one vinyl-terminated polysiloxane polymer is used in molar excess relative to the prepolymer, as described herein, the polyaddition reaction of these two components results in polymers having both vinyl groups, which are accessible to further addition polymerization reactions with hydrosilylation crosslinking agents, and tri-alkoxy silane end capping groups, which promote and improve adhesion of the eventually cured system to various surfaces, as described above. For the two-component silicone-based adhesive composition according to the present invention, the formation of such a polymer occurs in the preparation of the second component (B), that is, prior to the mixing of components (A) and (B). Methods for the preparation of both the component (A), as described herein, and the component (B), as described herein, are known in the art.

The two components (A) and (B) are stored separately until use. For use, the two components are mixed together in a manner known per se. In separated form, the two components (A) and (B) are storage-stable.

The silicone-based adhesive compositions of the invention may be liquid at application temperatures. It is preferred that the silicone-based adhesive compositions of the invention are liquid at room temperature. In various embodiments, the adhesive compositions according to the present invention have a viscosity of 50 to 200,000, especially 1,000 to 100,000 mPas at a temperature of 25° C. measured with Haake PK100 (RV 20 or RV30), RT 20, Physica MCR 301 or equivalent rheometers. "Liquid", as used herein, includes gels and pastes.

The adhesives can be applied to the substrate(s) by all known techniques. For example, dual cartridges and a pneumatic gun can be used for dispensing. The mixing can be done with a static mixer.

Thus, another embodiment of the invention is a method of use of the silicone-based adhesive compositions according to the present invention. In various embodiments, such a method encompasses a process of applying the adhesive composition to the surface of a substrate, whereby the adhesive is a silicone-based adhesive compositions as described above. In the case of a two-component silicone-based adhesive composition, as described herein, the two components (A) and (B) of the adhesive are mixed immediately before application. The adhesive composition is subsequently applied to the surface of the substrate.

Given the surprising finding that the —Si(OR$^a$)$_3$ terminated polyorganosiloxane prepolymer, as described herein, promotes and improves adhesion of polysiloxane-based adhesive compositions to various surfaces, a further object of the present invention is the use of a —Si(OR$^a$)$_3$ terminated polyorganosiloxane prepolymer, obtainable by reacting a hydrogen-terminated polyorganosiloxane with a vinyl and —Si(OR$^a$)$_3$ group containing silane, as described above, as an adhesion promoter in silicone-based adhesive compositions.

It is understood that all embodiments disclosed herein in relation to the methods are similarly applicable to the disclosed dispersions, compositions, and uses and vice versa.

The following examples are given to illustrate the present invention. Because these examples are given for illustrative purposes only, the invention should not be deemed limited thereto.

EXAMPLES

Example 1: Prepolymer Preparation

TABLE 1

|  | Prepolymer 1 | Prepolymer 2 |
| --- | --- | --- |
| SiH-terminated polydimethyl siloxane (Modifier 715) (wt. %) | 52.14 | 80.95 |
| Allyltrimethoxy silane (ATMO) (wt. %) | 47.83 | 19 |
| Pt catalyst (Catalyst 512) (wt. %) | 0.03 | 0.05 |
| SiH mmol | 151.21 | 234.76 |
| Vi mmol | 295.25 | 117.28 |
| mmol/g SiH residue | 0.00 | 1.17 |
| mmol/g Vi residue | 1.44 | — |
| SiH residue mmol | — | 117.47 |

The ingredients are mixed and reacted at room temperature. The reaction is exothermic (until 80° C.).

Example 2

Each Part B according to Table 2 was mixed with Part A1 according to Table 3 and thus obtained 2K formulations were tested. The results are shown in Table 4.

TABLE 2

| Part B formulations | | | |
| --- | --- | --- | --- |
|  | B1 | B2 | B3 |
| Vinyl-terminated polydimethylsiloxane (Polymer VS 5000 (Evonik Industries)) (wt. %) vinyl content: 0.06 mmol/g | 30.83 | 28.83 | 26.83 |
| Vinyl-terminated polydimethylsiloxane (Polymer VS 20000 (Evonik Industries)) (wt. %) vinyl content: 0.04 mmol/g | 20 | 20 | 20 |
| Vinyl-QM resin (VQM 803) (wt. %) | 5 | 5 | 5 |
| Carbon black filler (Raven 1020) (wt. %) | 0.1 | 0.1 | 0.1 |
| Surface modified filler (Silbond 8000 TS) (wt. %) | 40 | 40 | 40 |
| Hydrophilic fumed silica filler (Aerosil 200) (wt. %) | 4 | 4 | 4 |
| MVC 1% in VS 2000 (wt. %) (methylvinylcyclosiloxane) | 0.03 | 0.03 | 0.03 |
| Pt Catalyst (wt. %) | 0.04 | 0.04 | 0.04 |
| Allyltrimethoxy silane (wt. %) |  | 2 |  |
| Prepolymer 2 (according to Example 1) (wt. %) |  |  | 4 |

TABLE 3

Part A formulation

| | A1 |
|---|---|
| Vinyl-terminated polydimethylsiloxane (Polymer VS 5000) (wt. %) vinyl content: 0.06 mmol/g | 23 |
| Vinyl-terminated polydimethylsiloxane (Polymer VS 20000) (wt. %) vinyl content: 0.04 mmol/g | 22.82 |
| Vinyl-QM resin (VQM 803) (wt. %) | 5 |
| Surface modified filler (Silbond 8000 TS) (wt. %) | 40 |
| Hydrophillic fumed silica filler (Aerosil 200) (wt. %) | 4.1 |
| hydrosilylation crosslinking agent (Crosslinker 200) (wt. %) | 4 |
| SiH-terminated polydimethyl siloxane (Modifier 715) (wt. %) | 1.08 |

TABLE 4

Results

| | Formulation 1 (A1 + B1) (Comparative) | Formulation 2 (A1 + B2) (Comparative) | Formulation 3 (A1 + B3) |
|---|---|---|---|
| Alu/Alu 7 d (N/mm$^2$) MEK | 0.27 | 0.55 | 1.78 |
| Tensile strength (N/mm$^2$) | 4.5 | 3.42 | 2.3 |
| Elongation % | 279 | 248 | 391 |
| Modulus (N/mm$^2$) | 1.48 | 1.17 | 0.62 |

Example 3

Each Part B according to Table 5 was mixed with Part A2 according to Table 6 and thus obtained 2K formulations were tested. The results are shown in Table 7.

TABLE 5

Part B formulations

| | B4 | B5 |
|---|---|---|
| Vinyl-terminated polydimethylsiloxane (Polymer VS 1000) (wt. %) vinyl content: 0.11 mmol/g | 46.86 | 49.86 |
| Vinyl-QM resin (VQM 803) (wt. %) | 3 | 3 |
| Titanium dioxide filler (Kemira) (wt. %) | 0.1 | 0.1 |
| Surface modified filler (Silbond 8000 TS) (wt. %) | 40 | 40 |
| Hydrophilic fumed silica filler (Aerosil 200) (wt. %) | 6 | 6 |
| Pt Catalyst (wt. %) | 0.04 | 0.04 |
| Prepolymer 2 (according to Example 1) (wt. %) | 4 | 1 |

TABLE 6

Part A formulation

| | A2 |
|---|---|
| Vinyl-terminated polydimethylsiloxane (Polymer VS 5000) (wt. %) vinyl content: 0.06 mmol/g | 26.7 |
| Vinyl-terminated polydimethylsiloxane (Polymer VS 1000) (wt. %) vinyl content: 0.11 mmol/g | 21.4 |
| Vinyl-QM resin (VQM 803) (wt. %) | 1 |
| Surface modified filler (Silbond 8000 TS) (wt. %) | 38 |
| Hydrophillic fumed silica filler (Aerosil 200) (wt. %) | 7.6 |
| hydrosilylation crosslinking agent (Crosslinker 200) (wt. %) | 4.2 |
| SiH-terminated polydimethyl siloxane (Modifier 715) (wt. %) | 1.1 |

TABLE 7

Results

| | Formulation 4 (A2 + B4) | Formulation 5 (A2 + B5) |
|---|---|---|
| Tensile strength (N/mm$^2$) | 2.43 | 4.38 |
| Elongation % | 227.1 | 175.7 |
| Modulus (N/mm$^2$) | 1.1 | 2.21 |
| Shore Hardness | 33 | 45 |
| Alu/Alu 7 d (N/mm$^2$) MEK | 1.54 | 0.37 |
| Steel/steel 7 d (N/mm$^2$) | 1.8 | 0.27 |

Tensile Shear Strength

Alu/alu 7d means that two aluminum substrates were bonded and the lap shear strength was measured after 7 days. Steel/steel 7d means the same but on steel substrates. The Lap shear strength was determined according to DIN EN 1465. Lap shear specimen with the following dimensions were used: Length 100 mm, width 25 mm with and overlap of 322.6 mm2 and a gap of 1 mm.

Procedure: The formulation is spread on one lap-shear specimen of sufficient quantity such that when the lap-shear specimens are mated a 322.6 mm2 (0.5 in.2) area will be completely covered. If necessary, spread the adhesive using an appropriate utensil (applicator stick, tongue depressor, etc.) so as to ensure complete coverage of the bond area. Five specimens were used for each determination. The assembled lap shear was allowed to cure under normal conditions (23+/−2° C., relative humidity 50+/−5%) for 7 days. The test was carried out under normal conditions (23+/−2° C., relative humidity 50+/−5%) and the measurement was carried out after 7 days of curing. The test specimens have to be at the same temperature at which the measurement will take place. Place the test specimen in the grips of the testing machine so that the long axis of the test specimen coincides with the direction of applied tensile force through the center line of the grip assembly. Then the lap shear specimen is stretched to <0.1 MPa with a rate of 50 mm/min. Then, the force-joint displacement curve is recorded with a line speed of 50 mm/min.

Tensile Strength/Elongation/Modulus

Tensile strength and elongation at break were determined according to DIN 53504. Dumbbell specimens with the following dimensions were used: thickness 2+/−0.2 mm; bar width 10+/−0.5 mm; bar length approx. 45 mm; and total length 9 cm.

Procedure: the prepolymer mixture (formulation) was spread on an even surface forming a film with a thickness of 2 mm. The film was allowed to cure under normal conditions (23+/−2° C., relative humidity 50+/−5%) for 7 days, and then the dumbbell specimen was punched out. Five specimens were used for each determination. The test was carried out under normal conditions (23+/−2° C., relative humidity 50+/−5%) and the measurement was carried out after 7 days of curing. The test specimens have to be at the same temperature at which the measurement will take place. Before the measurement, the thickness of the test specimens is determined at least at three different positions, at the middle and at the extremes, with a caliper. The mean value is introduced in the measuring software. The test specimens are clamped into the tensile tester so that the longitudinal axis coincides with the mechanical axis of the tensile tester and comprises the largest possible surface of the rod heads, without clamping the middle bar. Then the dumbbell is stretched to <0.1 MPa with a rate of 50 mm/min. Then, the force-elongation curve is recorded with a line speed of 500 mm/min.

Evaluation: The following values are determined—breaking force in [N/mm²], elongation at break in [%], and modulus of elasticity in [N/mm²] at 100% elongation Shore Hardness Shore hardness was measured according to ISO 868.

What is claimed is:

1. Two-component silicone-based adhesive composition comprising
    a first component (A) comprising at least one vinyl-terminated polysiloxane polymer and at least one hydrosilyl group-containing crosslinker; and
    a second component (B) comprising at least one —Si(OR$^a$)$_3$ terminated polyorganosiloxane prepolymer, a hydrosilylation catalyst and at least one vinyl-terminated polysiloxane polymer, wherein OR$^a$ is a hydrolysable group, and the —Si(OR$^a$)$_3$ terminated polyorganosiloxane prepolymer is the reaction product of a hydrogen-terminated polyorganosiloxane with a vinyl and —Si(OR$^a$)$_3$ group containing silane in the presence of a catalyst, wherein the hydrogen-terminated polyorganosiloxane is used in molar excess with respect to the ratio of reactive hydrogen atoms to vinyl groups of the vinyl and —Si(OR$^a$)$_3$ group containing silane.

2. The two-component silicone-based adhesive composition according to claim 1, wherein the —Si(OR$^a$)$_3$ terminated polyorganosiloxane prepolymer is a —Si(OR$^a$)$_3$ terminated poly(diorganosiloxane) prepolymer.

3. The two-component silicone-based adhesive composition according to claim 2, wherein the alkyl groups of the —Si(OR$^a$)$_3$ terminated poly(diorganosiloxane) prepolymer are each independently selected from the group consisting of methyl and ethyl.

4. The two-component silicone-based adhesive composition according to claim 2, wherein the —Si(OR$^a$)$_3$ terminated poly(diorganosiloxane) prepolymer is —Si(OR$^a$)$_3$ terminated poly(dimethyl siloxane).

5. The two-component silicone-based adhesive composition according to claim 1, wherein OR$^a$ is an alkoxy or acyloxy group, the alkoxy groups selected from the group consisting of methoxy, ethoxy and propoxy.

6. The two-component silicone-based adhesive composition according to claim 1, wherein the —Si(OR$^a$)$_3$ group is a trialkoxy silyl group or a triacetoxy silyl group.

7. The two-component silicone-based adhesive composition according to claim 1, wherein the vinyl and —Si(OR$^a$)$_3$ group containing silane is a trialkoxy silane.

8. The two-component silicone-based adhesive composition according to claim 1, wherein the catalyst used in the formation of the at least one —Si(OR$^a$)$_3$ terminated polyorganosiloxane prepolymer is a platinum hydrosilation catalyst.

9. The two-component silicone-based adhesive composition according to claim 1, wherein the amount of the at least one —Si(OR$^a$)$_3$ terminated polyorganosiloxane prepolymer, is in the range of 1.5% to 30% by weight, based on the weight of the component (B) of the silicone-based adhesive composition.

10. An adhesion promoter in two- component silicone-based polyaddition curing adhesive compositions; comprising a —Si(OR$^a$)$_3$ terminated polyorganosiloxane prepolymer, wherein OR$^a$ is a hydrolysable group, that is the reaction product of a hydrogen-terminated polyorganosiloxane with a vinyl and —Si(OR$^a$)$_3$ group containing silane in the presence of a catalyst, wherein the hydrogen-terminated polyorganosiloxane is used in molar excess with respect to the ratio of reactive hydrogen atoms to vinyl groups.

11. The adhesion promoter according to claim 10, wherein the —Si(OR$^a$)$_3$ terminated polyorganosiloxane prepolymer is a —Si(OR$^a$)$_3$ terminated poly(diorganosiloxane) prepolymer.

12. The adhesion promoter according to claim 11, wherein:
    the alkyl groups of the —Si(OR$^a$)$_3$ terminated polyorganosiloxane prepolymer are each independently selected from the group consisting of methyl and ethyl; and/or
    the OR$^a$ groups of the vinyl and —Si(OR$^a$)$_3$ group containing silane are alkoxy groups.

13. The adhesion promoter according to claim 11, wherein:
    the —Si(OR$^a$)$_3$ terminated polyorganosiloxane prepolymer is —Si(OR$^a$)$_3$ terminated poly(dimethyl siloxane); and/or
    the vinyl and —Si(OR$^a$)$_3$ group containing silane is a trialkoxy silane.

\* \* \* \* \*